United States Patent
Sugata et al.

(10) Patent No.: US 6,905,294 B2
(45) Date of Patent: Jun. 14, 2005

(54) MAIN SHAFT DEVICE FOR MACHINE TOOLS

(75) Inventors: Shinsuke Sugata, Fukuyama (JP); Tadashi Makiyama, Onomichi (JP)

(73) Assignee: Horkos Corp., Fukuyama (JP)

( * ) Notice: Subject to any disclaimer, the term of this patent is extended or adjusted under 35 U.S.C. 154(b) by 0 days.

(21) Appl. No.: 10/479,411

(22) PCT Filed: May 27, 2002

(86) PCT No.: PCT/JP02/05128
§ 371 (c)(1),
(2), (4) Date: Dec. 3, 2003

(87) PCT Pub. No.: WO02/098605
PCT Pub. Date: Dec. 12, 2002

(65) Prior Publication Data
US 2004/0161315 A1 Aug. 19, 2004

(30) Foreign Application Priority Data
Jun. 4, 2001 (JP) ........................ 2001-167796

(51) Int. Cl.⁷ ............................ B23C 9/00; B23Q 11/10
(52) U.S. Cl. ........................... 409/136; 408/58; 408/59; 408/60; 409/218
(58) Field of Search ................................ 409/211, 214, 409/218, 135–136; 408/56–61; 407/11

(56) References Cited
U.S. PATENT DOCUMENTS

| | | | | |
|---|---|---|---|---|
| 4,320,999 A | * | 3/1982 | Briese | 409/136 |
| 5,203,651 A | * | 4/1993 | Johnson | 408/59 |
| 5,649,714 A | * | 7/1997 | Uchida et al. | 409/136 |
| 6,045,300 A | * | 4/2000 | Antoun | 407/11 |
| 6,059,702 A | * | 5/2000 | Winkler et al. | 409/136 |
| 6,305,696 B1 | * | 10/2001 | Sugata et al. | 408/57 |
| 6,582,167 B1 | * | 6/2003 | Sugata et al. | 409/136 |
| 2004/0067113 A1 | * | 4/2004 | Sugata et al. | 408/56 |
| 2004/0161315 A1 | * | 8/2004 | Sugata et al. | 409/64 |

FOREIGN PATENT DOCUMENTS

| | | |
|---|---|---|
| JP | 2000-84791 A | 3/2000 |
| JP | 2001-18148 A | 1/2001 |
| JP | 3316680 B1 | 6/2002 |

* cited by examiner

Primary Examiner—Erica Cadugan
(74) Attorney, Agent, or Firm—Merek, Blackmon & Voorhees, LLC

(57) ABSTRACT

The wasting of cutting fluid mists and contamination of a machining environment with cutting fluid mists are prevented by feeding optimum amounts of cutting fluid mists in a variety of machining operations. A main shaft device for machine tools, comprising a tool holder (8) fixed to a main shaft (2), the tool holder (8) being provided with a holder main body (8a), a chuck (18) and a cutting tool stopper member (20), it being arranged that cutting fluid mists inwardly fed into the main shaft (2) pass through a mist passageway formed in the cutting tool stopper member (20) and in a cutting tool (17), whereby they are spouted from the front end surface of the cutting tool (17), wherein the cutting tool stopper member (20) is composed of a main body member (22), and a front member (23) exchangeably fixed to the main body member (22) through a mounting/dismounting structure, and, in this case, the front member (23) serves as an adjusting nozzle member for controlling the flow rate of cutting fluid mists flowing out of the main body member (22) into the cutting tool (17).

3 Claims, 2 Drawing Sheets

MAIN SHAFT DEVICE FOR MACHINE TOOLS

FIELD OF THE INVENTION

The present invention relates to a main shaft device for machine tools, which spouts cutting fluid mists from a front end surface of a cutting tool.

BACKGROUND OF THE INVENTION

The applicants have already provided a main shaft device for machine tools comprising a tool holder removably fixed to the front of a main shaft driven for rotation, the tool holder comprising a holder main body, a chuck and a cutting tool stopper member. The main shaft supports the holder main body, and the chuck is mounted to the front of the holder main body. The cutting tool stopper member is mounted at the center of the holder main body, closely touching the rear end of a cutting tool clamped by the chuck, the stopper member controlling a backward displacement of the cutting tool. Cutting fluid mists fed inwardly into the rear of the main shaft through a mist passageway formed at the center of each of the cutting tool stopper member and the cutting tool spout from the front end surface of the cutting tool.

The cutting tool stopper member forms a straight cylindrical single member. The inner hole thereof is straight and has the same caliber in its optional longitudinal position.

Generally, the above-mentioned main shaft device has a marketable cutting tool mounted thereon. The caliber of a mist hole is suitably determined in accordance with an outer diameters or the length, of a cutting tool main body, the type of cutting tool or for the cutting tool maker's own peculiar reasons. Generally, the caliber of the mist hole has a size for passing a sufficient quantity of cutting fluid mists for various machining operations by the cutting tool.

In the above-mentioned main shaft device, the ability for feeding the cutting fluid mists from the main shaft to the cutting tool is made sufficient to carry out general various machining operations. Accordingly, cutting fluid mists arriving at the inside of the cutting tool after flowing out of the cutting tool stopper member spout from the front end surface of the cutting tool in a flow rate depending on the caliber or length of the mist passageway in the cutting tool.

Therefore, in many machining operations, too much cutting fluid mist comes to spout from the front end surface of the cutting tool, thereby wasting of cutting fluid mist and contaminating the machining environment with cutting fluid mist.

The present invention aims to provide a main shaft device for machine tools that can overcome the above problems.

SUMMARY OF THE INVENTION

The present invention is characterized in a main shaft device for machine tools having a tool holder removably fixed on the front of a main shaft. The tool holder comprises a holder main body supported by the main shaft, a chuck mounted on the front of the holder main body, and a cutting tool stopper member for controlling a backward displacement of a cutting tool clamped by the chuck. The cutting tool stopper member is mounted at the center of the holder main body to be closely touched to a rear end of the cutting tool. Here, cutting fluid mists fed into the rear of the main shaft spout from a front end surface of the cutting tool through a mist passageway formed to each center of the cutting tool stopper member and the cutting tool. In this case, the cutting tool stopper member is composed of a main body member, and a front member exchangeably fixed to the front of the main body member through a mounting/dismounting means. And, the front member serves as an adjusting nozzle member for controlling the flow rate of cutting fluid mists flowing out of the main body member into the cutting tool.

In case of a specified machining by a main shaft device relating to the present invention, when too many or too few cutting fluid mists spout from the front end surface of the cutting tool, the cutting tool stopper member is removed from the tool holder, and the front member of the adjusting nozzle member is exchanged for another one in different size to the caliber of a nozzle hole. According to this, the flow rate of the cutting fluid mists flowing out of the cutting tool stopper member into the cutting tool changes, thereby optimizing amounts of cutting fluid mists spouting from the front end surface of the cutting tool.

In this case, the caliber of the nozzle hole in the adjusting nozzle member forms about 80% or less of the minimum caliber of a mist passageway from the main shaft to the cutting tool stopper member. According to this, amounts of cutting fluid mists spouting from the front end surface of the cutting tool can be effectively controlled. On the other hand, when the size is larger than 80% of the minimum caliber of an inner hole in a mist feed tube, for example, when a ratio is about 85%, the flow of cutting fluid mists spouting from the front end surface of the cutting tool can not be controlled effectively.

PREFERRED EMBODIMENT OF THE INVENTION

The invention will be described with reference to the drawings.

Figure 1:
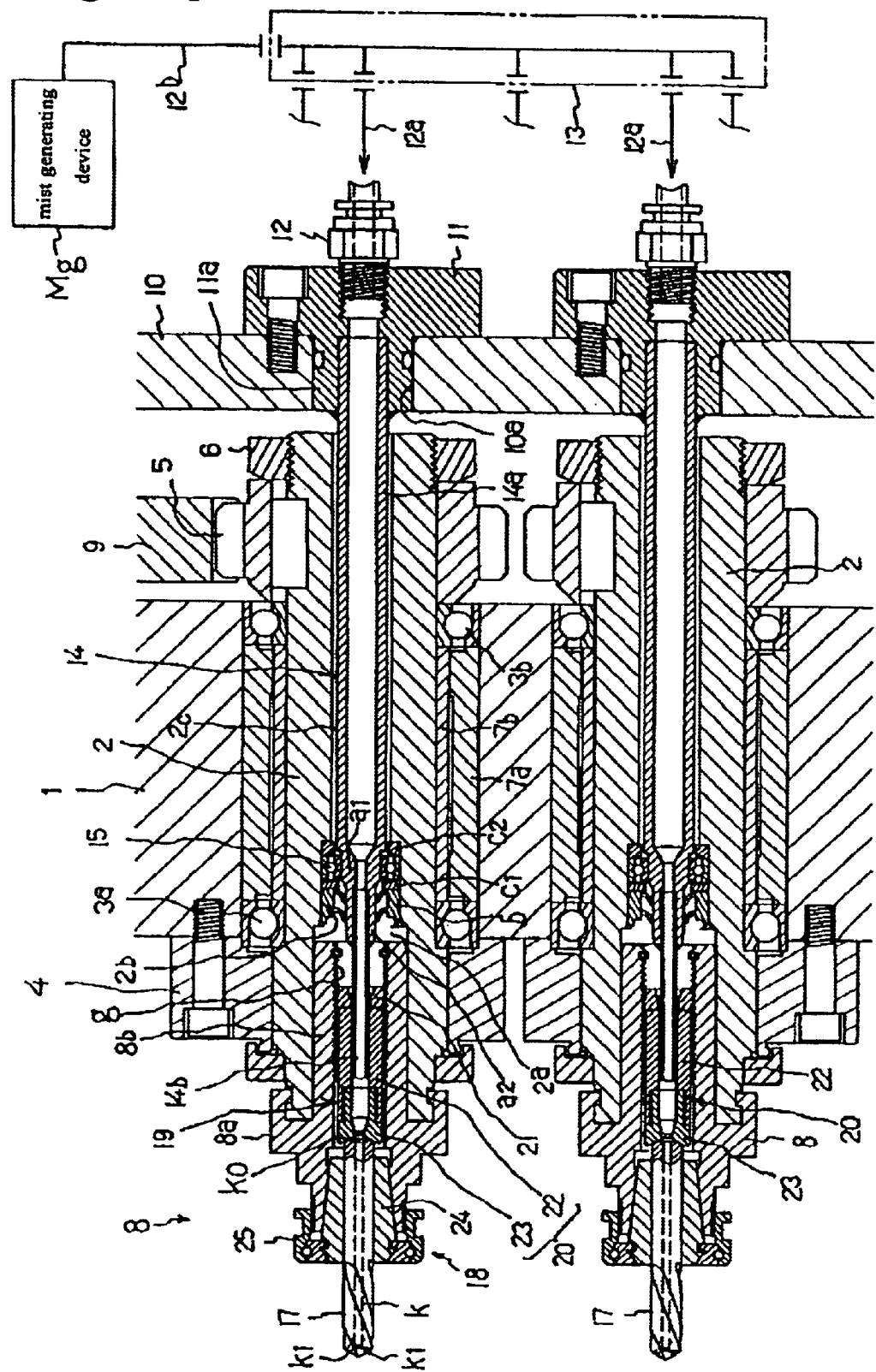
FIG. 1 is a cross-sectional view at side sight of a main shaft device for machine tools showing an example of the invention.
Figure 2:
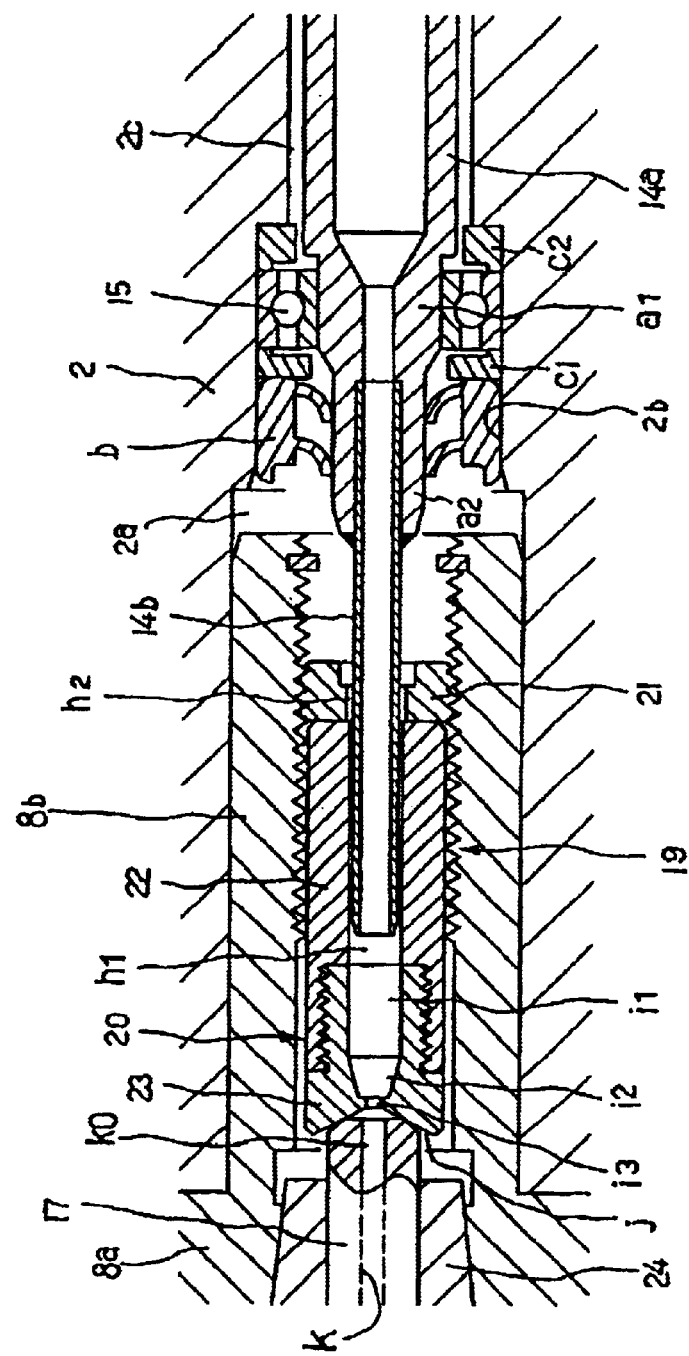
FIG. 2 is a cross-sectional view at side sight showing an important part of the main shaft device.

FIG. 1 shows a cross-section of a part of a main shaft device for machine tools with plenty of main shafts viewed from a side surface thereof. FIG. 2 shows a cross-section of an important part of the main shaft device viewed from a side surface thereof.

In these drawings, 1 is a base flame of a main shaft device, and a main shaft 2 is mounted in the flame 1 through bearings 3a, 3b rotatably at a fixed position.

Here, 4 is a ring member fixedly bolted to the front end surface of the flame 1, and 5 is an input gear externally inserted and keyedly fixed to the rear end surface of the main shaft 2. Numeral 6 is a nut body for controlling the input gear 5 from getting out of the main shaft 2, which is screwed to the rear end surface of the main shaft 2. Numeral 7a,7b are cylindrical spacers for controlling each longitudinal position of the bearings 3a,3b.

The main shaft 2 has an interfitted hole 2a with straight cylindrical female surface at the forward center, and straight reducing central holes 2b,2c connectively with the interfitted hole 2a. Numeral 8 is a tool holder mainly composed of a holder body 8a. An interfitting part 8b, which is a part of the holder body 8a, is internally fitted to the interfitted hole 2a of the main shaft 2 and removably fixed to the main shaft 2 through a thread coupling means.

Numeral 9 is a transmission gear rotatably supported by the flame 1 and engaged with the input gear 5, receiving rotation from a not-illustrated motor.

Numeral 10 is an additional flame provided behind the main shaft 2, having a through hole 10a just behind the main shaft 2. A cylindrical interfitting part 11a of a feed passageway member 11 is inserted into the through hole 10a, and the rear of the feed passageway member 11 is fixedly bolted to the additional flame 10. A splicing fitting 12 is screwed to the rear end of the feed passageway member 11. Here, a mist feed branch line 12a extending from a distributor 13 which is mounted apart from the main shaft device is inserted into the splicing fitting 12. And, a mist feed line 12b extending from a publicly known mist-generating device Mg is connected to the distributor 13.

A straight mist feed tube 14 non-touchable to the main shaft 2 is inserted into the interfitted hole 2a and the central holes 2b, 2c of the main shaft 2 non-rotatably and concentrically with the rotation center of the main shaft. As for the mist feed tube 14, a small caliber tube portion 14b is elongatively fixed on the front of a base tube portion 14a. The front of the base tube portion 14a forms stepped small caliber portions a1, a2. A bearing 15 for rotatably supporting the small caliber portion a1 is mounted between the small caliber portion a1 and the central hole 2b, and a ring seal member b is mounted in front of the bearing 15 between the other small caliber portion a2 and the central hole 2b. The rear end of the base tube portion 14a is fluid-tightly inserted into a central hole of the splicing fitting 12, and the front end of the small caliber tube portion 14b arrives at the interior of the central hole 2a.

In this case, ring-shaped spacers c1, c2 are provided between the bearing 15 and the ring seal member b as well as between the bearing 15 and the front end of the central hole 2c.

As for the tool holder 8, a collet chuck 18 is mounted to the front of the holder body 8a, and a central hole g is formed to the center thereof. Here, the collet chuck 18 fastens up the peripheral surface of a cutting tool 17 positioned at the forward center of the holder body 8a to be fixed thereon. The central hole g has a thread portion, and a cutting tool longitudinal position engaging means 19 is mounted therein.

The engaging means 19 comprises a straight cylindrical cutting tool stopper member 20 for controlling a backward displacement of the cutting tool 17, and a male thread member 21 for changeably adjusting a longitudinal position of the stopper member 20. Here, the stopper member 20 is inserted into the central hole g, and the male thread member 21 is screwed into the thread portion thereof. Besides, longitudinal through holes hi, h2 are formed in the center of each of the stopper member 20 and the male thread portion 21. The small caliber tube portion 14b is inserted into the longitudinal through holes hi, h2 non-contactably and closely, and the inserting length is shorter than the longitudinal length of the interfitted hole 8b.

The stopper member 20 comprises a rearward main body member 22 and a forward front member 23. A male thread formed to the rear end of the front member 23 is screwed in a female thread formed to the front end of the main body member 22, thereby coupling the front member 23 to the main body member 22 removably and integrally.

An inner hole h1 of the main body member 20 forms a straight cylindrical shape, and the caliber thereof closely resembles the outer diameter of the small caliber tube portion 14b. The front member 23 serves as an adjusting nozzle member for controlling the outflow of the cutting fluid mists. When the cutting fluid mists arrived at the interior of the inner hole h1 from the main shaft 2 side flow out to the cutting tool 17 side, the front member 23 gives a throttling effect to the flow. An inner hole of the front member 23 comprises a straight cylindrical hole ii with the same caliber as the inner hole hi, a conical female surface i2, and a nozzle hole i3 with a comparatively small caliber.

In this case, the caliber of the nozzle hole i3 forms about 80% or less of the minimum caliber of the inner hole in the mist feed tube 14 which is a mist passageway from the main shaft 2 to the stopper member 20. (In drawings, the minimum caliber corresponds to the caliber of the inner hole in the small caliber tube portion 14b). The nozzle member 23 is mounted exchangeably for another one different in size as to the caliber of the nozzle hole i3 in the event a different size is needed. In this case, it is better to prepare plural kinds of another adjusting nozzle members 23 with a caliber different in size to the nozzle hole i3 respectively in advance.

Besides, a front end surface j of the nozzle member 23 is closely touched to the rear end surface of the cutting tool 17 to form a conical female surface hollowed rearwardly. It is better to shorten the length of the inner hole h1 of a mist passageway from the small caliber tube portion 14b to the front end surface j by neighboring the front end surface j to the front end of the small caliber tube portion 14b as much as possible.

The collet chuck 18 comprises a collet 24 surrounding the peripheral surface of the cutting tool 17, and an operating nut portion 25 for displacing the collet 24 in the longitudinal direction.

Besides, the cutting tool 17 has a straight mist passageway k whose front is branched forkedly to the center. The branched parts are respectively opened to outlet openings kl, kl formed to both sides putting the center of the specified diameter of the front end surface of the cutting tool 17 between. On the other hand, the rear end of the mist passageway k is opened to an input opening kO formed at the center of the rear end surface of the cutting tool 17. The input opening kO is almost airtightly opened to the nozzle hole i3 under such a condition that the rear end surface of the cutting tool 17 is touched to the front end surface j of the nozzle member 23. Besides, though a twist drill is used as a cutting tool 17 in drawings, it is not limited to this.

Next, a use example and its operation of thus constructed main shaft device will be explained.

When mounting the cutting tool 17, the nut portion 25 of the collet chuck 18 is rotatably operated to the relaxing side to displace the collet 24 forwardly. According to this, the central hole of the collet 24 forms an enlarged caliber state. Thereafter, the rear of the cutting tool 17 is inserted into the central hole of the collet 25 until the rear end surface is touched to the front end surface j of the nozzle member 23. Then, the nut portion 25 is rotatably operated to the fastening side in keeping touchable state to displace the collet 24 backwardly. According to this, the collet 24 forms a reduced caliber state by wedge effect of the taper surface thereof, and therefore, the cutting tool 17 is fasteningly fixed to the holder body 8a.

When changing the longitudinal position of the cutting tool 17 to the holder body 8a, the tool holder 8 is released from the coupling with the main shaft 2 to be removed from the main shaft 2. Next, the male thread portion 21 is suitably rotated under such a condition that the cutting tool 17 is removed or longitudinally displaced. According to this, the male thread member 21 is displaced to the specified direction related to the rotation direction by thread feed effect, thereby adjustably changing the position of the stopper member 20 to the holder body 8a. Then, the cutting tool 17 is fixed to the holder body 8a so that the rear end surface touches to the front end surface of the stopper member 20. Thereafter, the tool holder 8 is mounted on the main shaft 2.

When mounting or dismounting the tool holder 8 to the main shaft 2, the main shaft 2 is released from the thread coupling means, whereby the interfitting portion 8b of the holder body 8a is pulled out of or inserted in the interfitted hole 2a.In this case, since the interfitting portion 8b is exactly guided in a central longitudinal direction of the main shaft 2 by the interfitted hole 2a, the small caliber tube portion 14b is prevented from touching to the longitudinal inner hole h1 of the engaging means 19.

Next a situation that a work is machined will be explained. The main shaft 2 receives rotation of a not-illustrated motor through the transmission gear 9 or the input gear 5, rotating at a fixed position of the flame 1 supportively by the bearings 3a, 3b. The rotation of the main shaft 2 is transmitted to the cutting tool 17 through the holder body 8a and the collet chuck 18. In this case, the engaging means 19 is also rotated integrally with the holder body 8a.

On the other hand, since the mist feed tube 14 has the front end supported by the bearing 15 as well as the rear end supported integrally with the additional flame 10, it is kept in non-rotatable state regardless of the rotation of the main shaft 2. In this case, the seal member b is airtightly shut in an interval between the peripheral surface of the central hole 2b of the rotatable main shaft 2 and the base tube portion 14a of the non-rotatable mist feed tube 14.

Under such a condition, cutting fluid mists (which is fine cutting fluid grains lain scattered in air) generated in the mist-generating device Mg are fed into the mist feed tube 14 through the mist feed line 12b and the distributor 13, and through the mist feed branching line 12a and the feed passageway member 11. Then, the cutting fluid mists flow into the inner hole h1 of the main body member 22 of the stopper member 20 through the small caliber tube portion 14b of the feed tube 14. The cutting fluid mists arrived at the interior of the main body member 22 flow out into the mist passageway k of the cutting tool 17 through the nozzle hole i3 of the nozzle member 23 as receiving throttle effect of the nozzle hole i3. In this case, the nozzle member 23 works so as to control the flow of cutting fluid mists from the inner hole h1 to the mist passageway k in a fixed degree. Accordingly, the cutting fluid mists arrive at the interior of the cutting tool 17 in a suitable flow rate, spouting out of the outlet openings k1, k1 of the front end thereof. Thus spouted cutting fluid mists equally lubricate and cool a friction position between the cutting tool 17 and the work.

While the cutting fluid mists flow in the main shaft 2 or the tool holder 8, the cutting fluid mists flowed out of the small caliber tube portion 14b are apt to leak into the air through a ring space formed between the inner hole h1 of the stopper member 20 and the outer peripheral surface of the small caliber tube portion 14b. However, the cutting fluid mists are prevented from flowing out of the interior of the interfitted hole 2a forwardly by an airtight fitting coupling of the tool holder 8 and the main shaft 2, and from flowing out of the interior thereof backwardly by the seal member b.

The cutting fluid mists have a tendency to be liquefied by pressure change, speed change and centrifugal force in the main shaft 2 or the tool holder 8. On the other hand, since the mist feed tube 14 is straightly arranged and keeps in non-rotatable state, the cutting fluid mists flowing therein are inhibited from large pressure change or speed change, besides receiving no centrifugal force by the rotation of the main shaft 2. Accordingly, the liquefaction of the cutting fluid mists from the rear of the main shaft 2 to the inner hole h1 of the stopper member 20 is prevented effectively.

Besides, the cutting fluid mists flowed out of the small caliber tube portion 14b flow out through the inner hole h1 of the stopper member 20 or through the mist passageway k of the cutting tool 17. In this case, since the inner hole h1 and the mist passageway k have comparatively large caliber in comparison with the nozzle hole i3 of the nozzle member 23, the cutting fluid mists can flow without large flowing resistance. Even if the inner hole h1 and the mist passageway k exist at each rotation center of the tool holder 8 and the cutting tool 17, even if they have the length shorter than the main shaft 2, and even if they have the caliber larger than the nozzle hole i3, since each caliber is still small in relation to centrifugal force given to the cutting fluid mists by the rotation of the tool holder 8, the cutting fluid mists flowing therein never receive the large centrifugal force for a long time. Accordingly, the cutting fluid mists in the inner hole h1 or the mist passageway k is also prevented from being liquefied effectively.

When machining a new work with the above-mentioned main shaft device in different conditions, the cutting fluid mists spouted from the front end surface of the cutting tool 17 are sometimes too many, and sometimes too few. In this case, the tool holder 8 is removed from the main shaft 2, and the stopper member 20 is picked out of the holder body 8a outwardly. Then, the nozzle member 23 of a front member of the stopper member 20 is removed from the main body member 22 by releasing from the thread coupling. And then, another adjusting nozzle member 23 with a nozzle hole i3 in a different caliber is newly mounted. Thus an exchange of the nozzle member 23 is accomplished.

Therefore, since a limitation is different in the flow of cutting fluid mists by the nozzle member 23, the flow rate of cutting fluid mists spouted from the front end surface of the cutting tool 17 is optimized.

According to the invention constructed as above mentioned, even if the ability for feeding cutting fluid mists from a main shaft into a cutting tool stopper member is fixed, the flow rate of cutting fluid mists spouted from the front end surface of a cutting tool can be optionally changed by exchanging an adjusting nozzle member for another one. Therefore, optimum amounts of cutting fluid mists can be fed in various works machining, thereby preventing the wasting of cutting fluid mists and contamination of a machining environment with cutting fluid mists. Besides, a tool holder is removed from the main shaft, and the cutting tool stopper member is picked out outwardly, whereby the adjusting nozzle members can be exchangeably mounted conveniently. Moreover, these effects are realized by only changing a cutting tool stopper member in a conventional main shaft device.

Furthermore, since the caliber of a nozzle hole in an adjusting nozzle member forms about 80% or less of the minimum caliber of a mist passageway from a main shaft to a cutting tool stopper member, the flow rate of cutting fluid mists spouted from the front end surface of a cutting tool can be effectively changed.

What is claimed is:

1. A main shaft device for machine tools comprising:
   a main shaft (2) having a front and a rear;
   a tool holder (8) fixed on the front of said main shaft (2), said tool holder (8) including
   a holder body (8a) supported by the main shaft (2), the holder body having a front and a center;
   a chuck (18) mounted on the front of the holder body (8a); and
   a cutting tool stopper member (20) mounted in the center of the holder body (8a), said cutting tool stopper member touching a rear end of a cutting tool (17) clamped by the chuck (18) to control backward displacement of the cutting tool (17); and an arrangement spouting cutting fluid mists fed into the rear of the main shaft (2) from a front end surface of the cutting tool (17) through mist passageways formed in each of the cutting tool stopper member (20) and the cutting tool (17), wherein the cutting tool stopper member (20) has a main body member (22) having a front, and a front member (23) exchangeably fixed to the front of the main body member (22) to serve as an adjusting nozzle member for controlling the flow rate of cutting fluid mists flowing out of the main body member (22) into the cutting tool (17).

2. A main shaft device for machine tools as claimed in claim 1, wherein the flow rate of cutting fluid mists flowing out of said cutting tool stopper member (22) (20) into said cutting tool (17) is optionally changed by exchangeably mounting said adjusting nozzle member.

3. A main shaft device for machine tools as claimed in claim 1, wherein the front member (23) has a nozzle hole (i3) having a caliber that is 80% or less of the minimum caliber of a mist passageway through said main shaft (2) and into said cutting tool stopper member (20).

* * * * *